United States Patent [19]
Anderson

[11] Patent Number: 5,397,543
[45] Date of Patent: Mar. 14, 1995

[54] GAS GENERATOR

[75] Inventor: Steven J. Anderson, Willis, Mich.

[73] Assignee: Automotive Systems Laboratory, Inc., Farmington Hills, Mich.

[21] Appl. No.: 80,299

[22] Filed: Jun. 21, 1993

[51] Int. Cl.⁶ .............................................. B01J 7/00
[52] U.S. Cl. ................... 422/165; 102/443; 102/530; 280/742; 422/305
[58] Field of Search ............... 422/164, 165, 166, 167, 422/305; 280/736, 741, 742; 102/530, 531, 285, 286, 288, 443

[56] References Cited

U.S. PATENT DOCUMENTS

| | | | |
|---|---|---|---|
| 4,203,787 | 5/1980 | Kirchoff et al. | 149/35 |
| 4,296,084 | 10/1981 | Adams et al. | 422/166 |
| 4,316,874 | 2/1982 | Kasama et al. | 422/166 |
| 4,369,079 | 1/1983 | Shaw | 149/2 |
| 4,578,247 | 3/1986 | Bolieau | 422/166 |
| 4,722,551 | 2/1988 | Adams | 280/736 |
| 5,009,855 | 4/1991 | Nilsson | 422/166 |
| 5,104,466 | 4/1992 | Allard et al. | 280/741 |
| 5,294,414 | 3/1994 | Brede et al. | 422/305 |

FOREIGN PATENT DOCUMENTS 528512 7/1956 Canada ............................... 162/530

*Primary Examiner*—Peter Kratz
*Attorney, Agent, or Firm*—Lyman R. Lyon

[57] ABSTRACT

A gas generator comprises a propellant container having an igniter at one end thereof for igniting a propellant, a secondary propellant charge comprising a plurality of circular grains having a diameter to thickness ratio greater than 2.5, and a primary propellant charge disposed between said igniter and said secondary propellant charge comprising a plurality of circular grains having a diameter to thickness ratio less than 2.

3 Claims, 2 Drawing Sheets

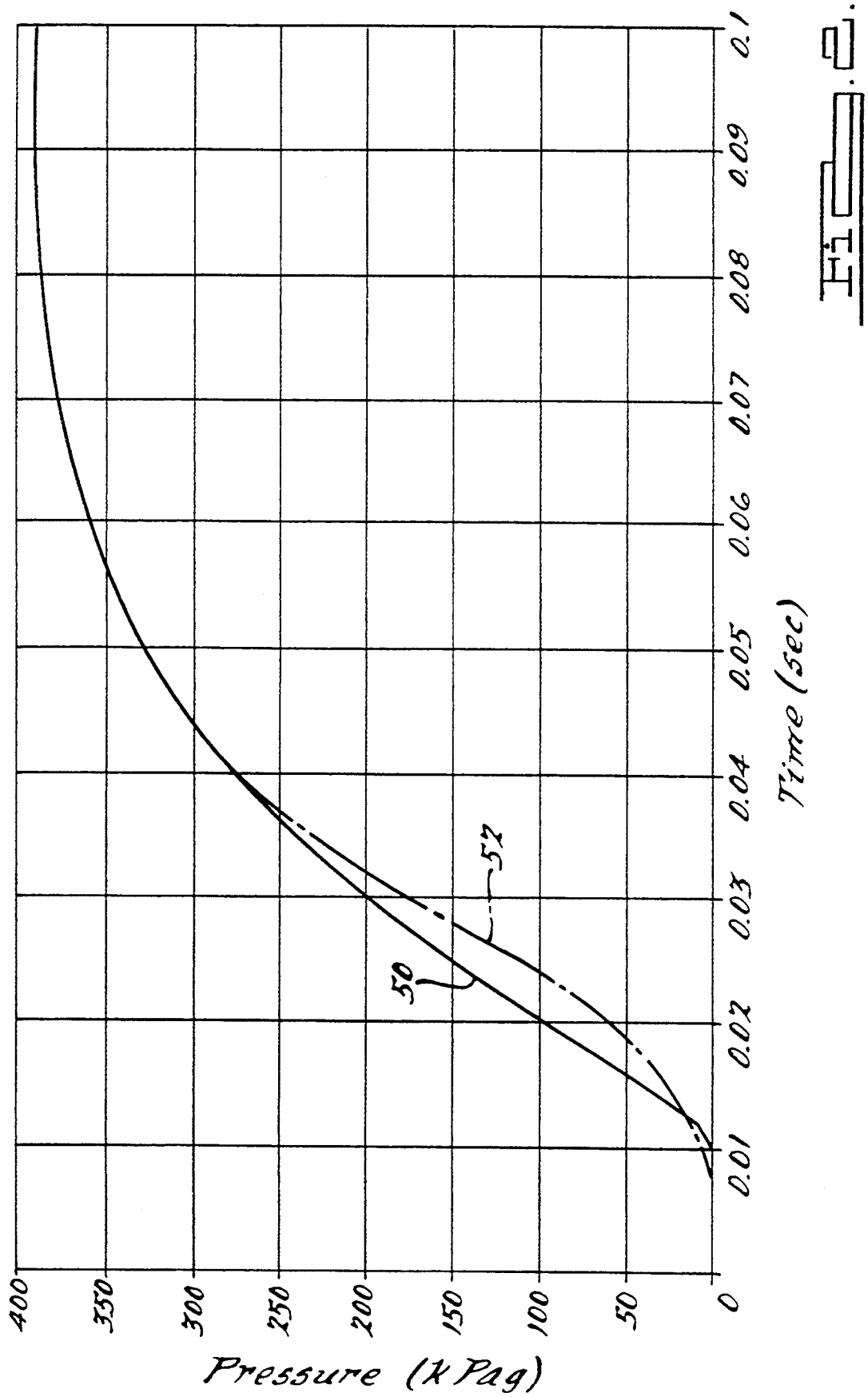

5,397,543

GAS GENERATOR

BACKGROUND OF THE INVENTION

The rate of pressure buildup of gas emanating from an automobile air bag inflator is subject to strict requirements to avoid injury to out of position vehicle occupants. Aggressive, uncontrolled onset rates of pressurization are undesirable since excessively rapid inflation of the air bag may impact against the occupant. Essential to the concept of the present invention is the discovery that crushing of the propellant grains adjacent to the initiator of the inflator due to a shock wave developed by the initiator is a contributory cause of such excessive onset rates.

SUMMARY OF THE INVENTION

The aforesaid problem is solved, in accordance with the present invention, by utilizing high crush strength propellant grains immediately adjacent the inflator initiator. Use of such high strength grains minimizes crush of the propellant from high output initiators while minimizing time lapse to first gas production.

BRIEF DESCRIPTION OF THE DRAWINGS

FIG. 2 is a graph of inflator pressure curves.

DETAILED DESCRIPTION OF THE PREFERRED EMBODIMENT

Figure 1:
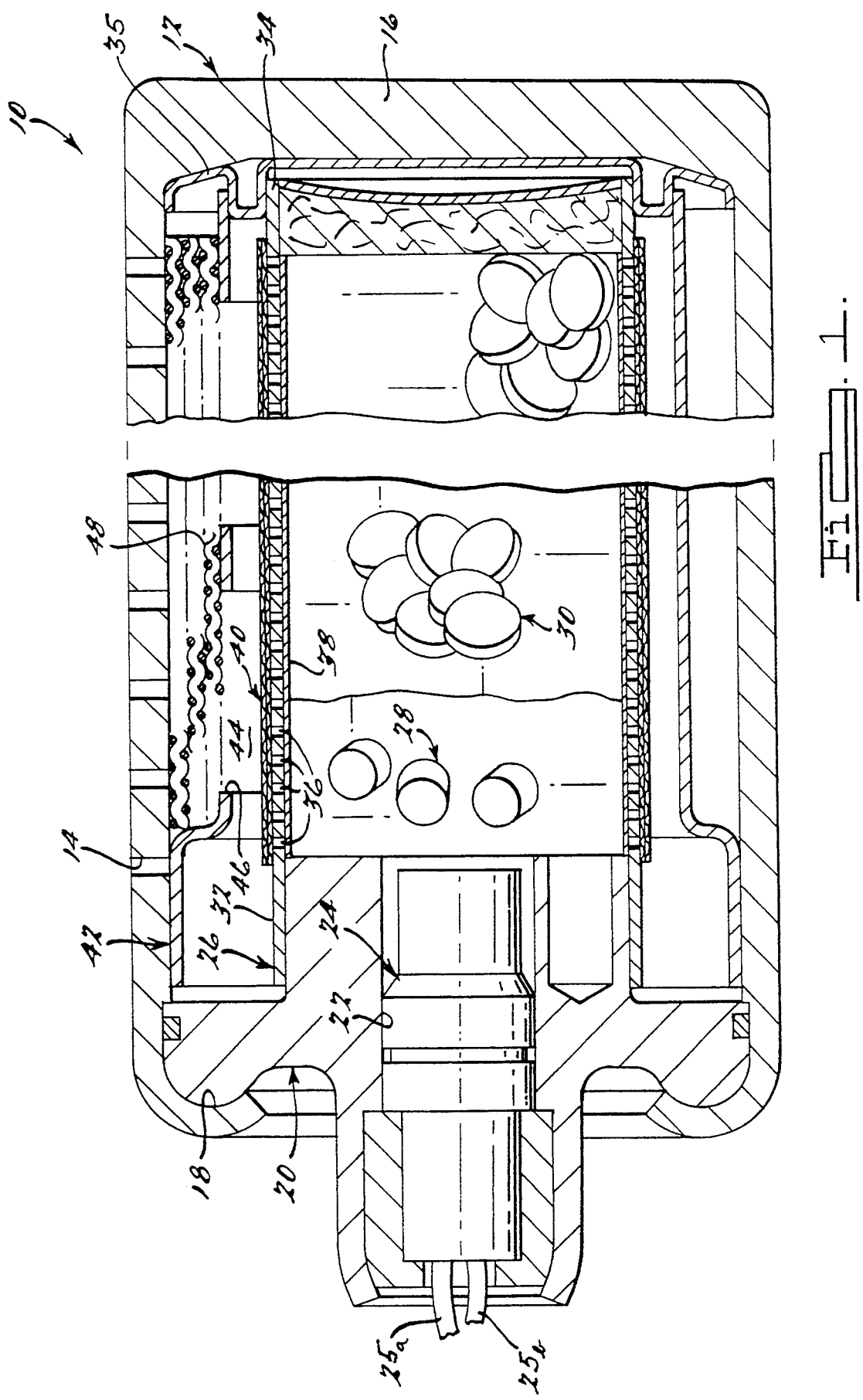
FIG. 1 is a cross-sectional view of an inflator showing relative propellant grains sizes in accordance with the invention.

As seen in the drawings, a gas generator 10, in accordance with an exemplary constructed embodiment of the invention, comprises a housing 12, for example, an aluminum forging provided with a plurality of gas discharge orifices 14. The housing 12 has an integral end closure 16 at one end and is open at the opposite end 18 for the acceptance of an end closure 20. The end closure 20 has a central bore 22 for the acceptance of a conventional igniter 24. The igniter 24 is provided with a pair of electrical conductors 25a and 25b to facilitate electric ignition of an explosive charge contained therein.

A cylindrical propellant tube 26 supports a plurality of primary propellant grains 28 and secondary propellant grains 30. The grains 28 and 30 are of different configuration for a reason to be described.

The tube 26 has one end portion 32 supported by the end closure 20 and an opposite end portion 34 supported by a clip 35 at the closed end portion 16 of the housing 12.

The propellant tube 26 is provided with a plurality of relatively small apertures 36 such that approximately 25–40% of the tube 26 is open. The apertures 36, in the constructed embodiment of the invention, are 1.6 mm ($\approx$0.063 in.) in diameter. The inside of the propellant tube 50 is provided with a burst foil 38 which controls pressure buildup and flame front propagation through the propellant grains 28 and 30 disposed internally of the propellant tube 26.

The propellant tube 26 is surrounded by a slagging screen 40 comprising one or more layers of 20 mesh wire having a wire diameter of 0.58 mm ($\approx$0.023 in.). A baffle tube 42 is telescoped about the propellant tube 26 in radially spaced relation to the slagging screen 40 thereon, so as to define a plenum 44 radially outwardly from the filter screen 40. The baffle tube 42 is provided with a plurality of relatively large apertures 46 and is surrounded by a final filter screen 48.

Gas generated by the propellant grains 28 and 30 exit from the propellant tube 26 through the apertures 36 therein, pass through the slagging screen 40 and enter the plenum 44 defined by the space between the slagging screen 40 and the radially inner wall of the baffle tube 42. Thereafter, the gases flow radially outwardly through the apertures 46 in the baffle tube 42 to exit through the orifices 14 in the housing 12.

Conventionally, the secondary propellant grains 30 have a diameter to thickness ratio of 2 or more, for example, 9.53 mm ($\approx$0.375 in.) in diameter by 3.3 mm ($\approx$0.13 in.) thick. The average crush strength of the pellets 30 is approximately 20 kPag (2.9 psig).

I have discovered that if the conventionally sized secondary propellant grains 30 are placed within the first 25–75 mm ($\approx$0.98–2.95 in.) of the propellant tube 26, the grains 30 are subject to crushing by a shock wave from the igniter 24. When the propellant grains 30 are reduced to relatively small particles by such crushing, combustion is accelerated resulting in a rapid and sometimes uncontrolled and excessive pressure rise.

In accordance with the present invention, this problem is solved by changing the diameter to thickness ratio of the primary propellant grains 28 to less then 2, for example, to a diameter of 6 mm ($\approx$0.24 in.) or less and a thickness of 4 mm ($\approx$0.16 in.) or more. Thus, when the shock wave from the igniter 24 hits the primary propellant grains 28, the increased crush strength thereof, determined by the aforesaid diameter to thickness ratio, eliminates crushing thereby reducing the burn or onset rate of the inflator 10.

As seen in FIG. 2, excessive rise of airbag inflation pressure in the first 30 milliseconds after ignition is illustrated by curve 50. Such rapid pressure rise is caused by crushing of the heretofore used propellant grains 30. However, and in accordance with the present invention, when low ratio propellant grains 28 are utilized in the first 25–75 mm ($\approx$0.98–2.95 in.) of the propellant tube, it is possible to obtain a more desirable "low onset" curve as illustrated by curve 52.

While the preferred embodiment of the invention has been disclosed, it should be appreciated that the invention is susceptible of modification without departing from the scope of the following claims.

I claim:

1. In a gas generator comprising a propellant tube having a plurality of apertures therein, an igniter at one end thereof for igniting a propellant, and a secondary propellant charge in the propellant tube comprising a plurality of right circular cylindrical propellant grains having a diameter to thickness ratio greater than 2, the improvement comprising;

a primary propellant charge disposed in the first 25 to 75 mm of the propellant tube between said igniter and said secondary propellant charge comprising a plurality of right circular cylindrical propellant grains having a diameter to thickness ratio less than 2 to minimize propellant grain crushing in said primary charge by a shock wave from said igniter.

2. A gas generator in accordance with claim 1 wherein said primary propellant charge comprises grains having a minimum thickness dimension of 4 mm ($\approx$0.16 in.).

3. A gas generator in accordance with claim 2 wherein said primary propellant charge comprises grains having a maximum diameter of 6 mm ($\approx$0.24 in.).

* * * * *